（12） United States Patent
Shibuya

(10) Patent No.: US 11,736,657 B2
(45) Date of Patent: Aug. 22, 2023

(54) IMAGE CAPTURING DEVICE AND IMAGE PROCESSING METHOD THAT ENLARGES A SELECTED REGION WITHIN AN IMAGE

(71) Applicant: HITACHI KOKUSAI ELECTRIC INC., Tokyo (JP)

(72) Inventor: Takuhiro Shibuya, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 17/753,941

(22) PCT Filed: Sep. 10, 2020

(86) PCT No.: PCT/JP2020/034217
§ 371 (c)(1),
(2) Date: Mar. 18, 2022

(87) PCT Pub. No.: WO2021/054235
PCT Pub. Date: Mar. 25, 2021

(65) Prior Publication Data
US 2022/0377255 A1 Nov. 24, 2022

(30) Foreign Application Priority Data
Sep. 20, 2019 (JP) ................................ 2019-171084

(51) Int. Cl.
*H04N 5/262* (2006.01)
*H04N 23/80* (2023.01)
(52) U.S. Cl.
CPC ......... *H04N 5/2628* (2013.01); *H04N 23/815* (2023.01)
(58) Field of Classification Search
CPC .. H04N 5/2628; H04N 5/23235; H04N 1/387; H04N 1/393; H04N 5/232
See application file for complete search history.

(56) References Cited

U.S. PATENT DOCUMENTS

| 2014/0375836 A1* | 12/2014 | Amitay ................. G06T 3/40 348/222.1 |
| 2019/0379824 A1* | 12/2019 | McGarvey ............... H04N 1/21 |

FOREIGN PATENT DOCUMENTS

| JP | 2007336524 A | 12/2007 |
| JP | 2010130540 A | 6/2010 |
| JP | 2011091493 A | 5/2011 |

OTHER PUBLICATIONS

ISR issued in PCT/JP2020/034217, dated Nov. 9, 2020.

* cited by examiner

*Primary Examiner* — Mekonnen D Dagnew
(74) *Attorney, Agent, or Firm* — Greer Burns & Crain Ltd.

(57) ABSTRACT

An image capturing device in the present embodiment has a configuration that is provided with an image splitting unit 21 and an edge extracting unit 22 that acquire the edge component for each block image that has been divided from an image captured by an image sensor 10, a resolution controlling unit 23 that writes each block image into a frame memory 30 with a resolution in accordance with the amount of its edge component, an image enlarging unit 24 that reads out at least one block image that corresponds to a selected region from the frame memory 30 and enlarges the block image with a magnification in accordance with the size of the selected region, and an enlarged output unit 45 that outputs the enlarged block image that corresponds to the selected region that is supplied from the image enlarging unit 24.

3 Claims, 4 Drawing Sheets

FIG. 4

| | Original image | Enlarged image | System | Amount of used memory |
|---|---|---|---|---|
| (1) | | | The entire region is recorded with a low resolution | The same as the prior art (low-resolution camera) |
| (2) | | | The entire region is recorded with a high resolution | Four times greater than that in the system(1) |
| (3) | | | Only the enlarged region is recorded with a high resolution | 1 to 1.5 times greater than that in the system(1) (depending on the lowest magnification for enlargement) |
| (4) | | | The region having a large amount of edge component is recorded with a high resolution. The remaining region is recorded with a low resolution | 1.2 to 1.6 times greater than that in the system(1) (depending on the ratio of the high-resolution region) |
| Remarks | : Recorded with a high resolution  : Recorded with a low resolution  : Not recorded  : Enlarged region | : High resolution  : Low resolution | | |

IMAGE CAPTURING DEVICE AND IMAGE PROCESSING METHOD THAT ENLARGES A SELECTED REGION WITHIN AN IMAGE

TECHNICAL FIELD

The present invention relates to an image capturing device having a function of enlarging and then outputting a designated region within an image that has been taken by an image sensor.

BACKGROUND ART

In recent years, an increase in the resolution of image capturing devices such as digital cameras and video cameras has been progressing (for example, 4K, 8K). In image capturing devices for the purpose of films and broadcasting, images can be gained with such a high resolution that jaggedness is not conspicuous even if images are enlarged to be shown on a large-scale screen or TV monitor. Meanwhile, the display devices for the images taken by image capturing devices for industrial or medical purposes do not necessarily have a monitor with a large screen, and in some cases, a monitor with a small screen and low resolution is used. As a method for showing images that have been taken with high resolution on such a monitor with a small screen and low resolution, a method for electrically enlarging part of a region of the image for display (hereinafter, referred to as digital zooming) is quite often used (see Patent Literature 1).

PRIOR ART LITERATURE

Patent Literature

Patent Literature 1: JP2010-130540A

SUMMARY OF THE INVENTION

Problems to be Solved

In digital zooming, an image that has been taken is coordinate transformed, and in some cases, it is necessary for the image that has been taken to be once stored in a frame memory in order to carry out an ultrahigh-resolution process on the image before output. As the resolution of the image increases, however, the capacity of the frame memory for recording the image also increases in proportion to the number of pixels, which causes such a problem that the costs for the parts increase or there is a lack of area on which the parts are to be mounted. The memory capacity can be reduced in the case where the images that are recorded in the frame memory are limited to those with enlarged magnification. In digital zooming with a low magnification such as 1.1× or 1.2×, however, the required memory capacity is not so different from that in the case of recording the entire region, and after all, a memory with a large capacity becomes necessary as a whole. In the case where the magnification of digital zooming is limited to 2× or greater, the memory capacity as a whole can be reduced; however, this is not preferable for the users who require images with a low magnification.

The present invention is provided in view of the above-described conventional state, and an object thereof is to provide an image capturing device where the capacity of the frame memory that is to be used for digital zooming is kept low, and it is still possible to gain a high-definition image even after digital zooming.

Solution to Problems

In order to achieve the above-described object, the present invention provides an image capturing device with the following configuration.

That is to say, the image capturing device image according to the present invention is an image capturing device that enlarges a selected region within an image captured by an image sensor and outputs the enlarged region, which is characterized by having: a block-by-block edge acquiring unit that acquires an edge component for each block image that has been divided from the image captured by the image sensor; a resolution controlling unit that writes each block image into a frame memory with a resolution in accordance with the amount of the edge component of the block image; an image enlarging unit that reads out from the frame memory at least one block image that corresponds to the selected region, and enlarges the block image that has been read out with a magnification in accordance with the size of the selected region; and an enlarged output unit that outputs the enlarged block image that corresponds to the selected region that has been gained by the image enlarging unit.

Here, the above-described resolution controlling unit may have such a configuration as to preferentially write a first block image having a large amount of edge component into the frame memory with a first resolution, and writes a second block image other than the first block image into the frame memory with a second resolution lower than the first resolution.

The image capturing device may further be provided with a standard output unit that outputs the entirety of the image captured by the image sensor with a magnification of one.

Advantageous Effects of the Invention

The present invention can provide an image capturing device where the capacity of the frame memory that is used for digital zooming is kept low, and it is still possible to gain an image with high resolution even after digital zooming.

BRIEF DESCRIPTION OF DRAWINGS

FIG. 4 is a diagram for illustrating the difference between the conventional system and the system in the present invention.

DESCRIPTION OF EMBODIMENTS

The image capturing device according to one embodiment of the present invention is described in reference to the drawings.

Figure 1:
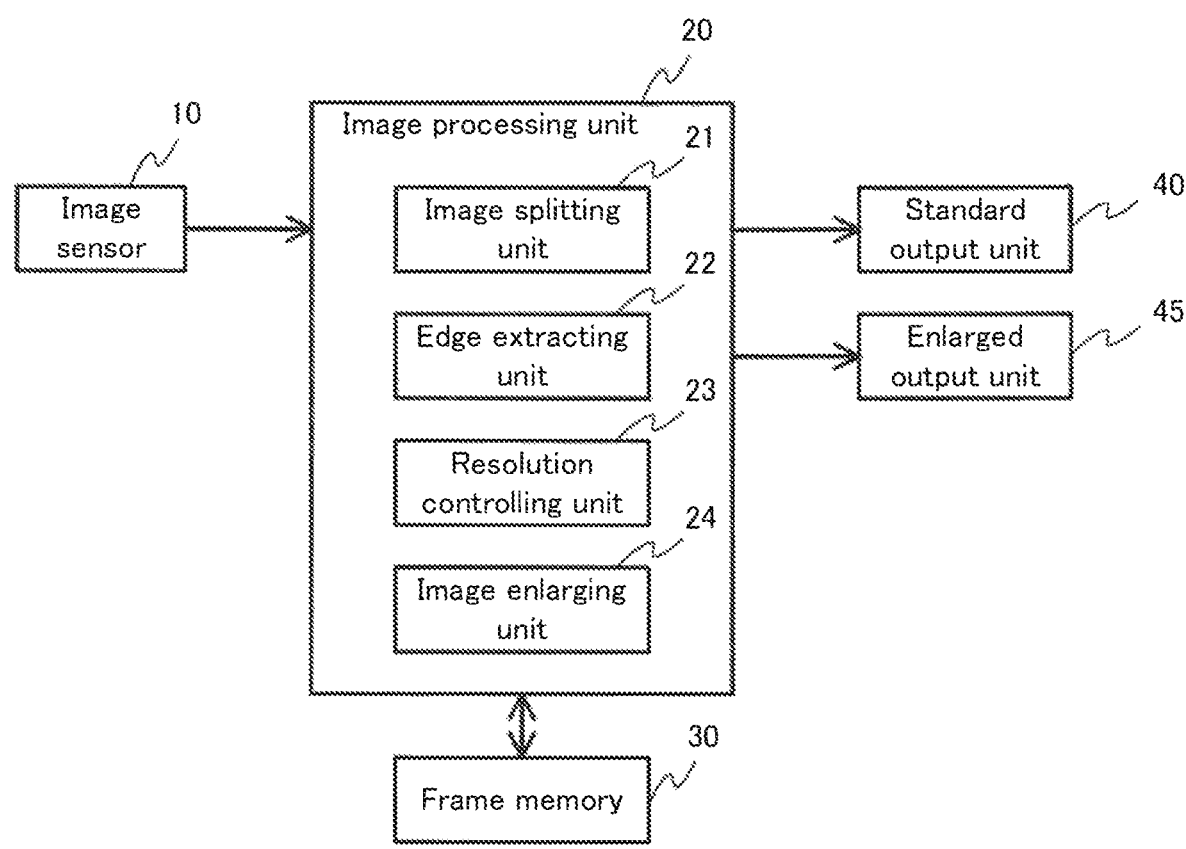
FIG. 1 is a diagram showing an example of the configuration of the image capturing device according to one embodiment of the present invention.

FIG. 1 shows an example of the configuration of the image capturing device according to one embodiment of the present invention. The image capturing device in the present embodiment is provided with an image sensor 10 such as a CMOS (complementary metal oxide semiconductor) or a CCD (charge-coupled device) for converting an optical image of a subject to an electrical signal (image), an image processing unit 20 for carrying out various types of image processes that include digital zooming on an image that has been taken by the image sensor 10, a frame memory 30 that is used for digital zooming, a standard output unit 40 for outputting the entirety of a captured image with a magnification of one, and an enlarged output unit 45 for outputting an enlarged image that is gained by enlarging a selected region within a captured image through digital zooming.

The image processing unit 20 has a function of implementing various types of image processes, and it is possible to implement this unit by using various types of processors such as a CPU (central processing unit), a GPU (graphics processing unit), and a DSP (digital signal processor). The image processing unit 20 in the present embodiment has, as a function unit that relates to digital zooming, an image splitting unit 21, an edge extracting unit 22, a resolution controlling unit 23, and an image enlarging unit 24.

The image splitting unit 21 splits an image that has been captured by the image sensor 10 into a plurality of block images. The edge extracting unit 22 extracts an edge component for each block image that has been split by the image splitting unit 21. The resolution controlling unit 23 writes each block image that has been split by the image splitting unit 21 into the frame memory 30 with the resolution in accordance with the amount of the edge component that has been extracted by the edge extracting unit 22. The image enlarging unit 24 reads out from the frame memory 30 one or more block images that correspond to a selected region, and enlarges the block images to a magnification in accordance with the size of the selected region.

Figure 2:
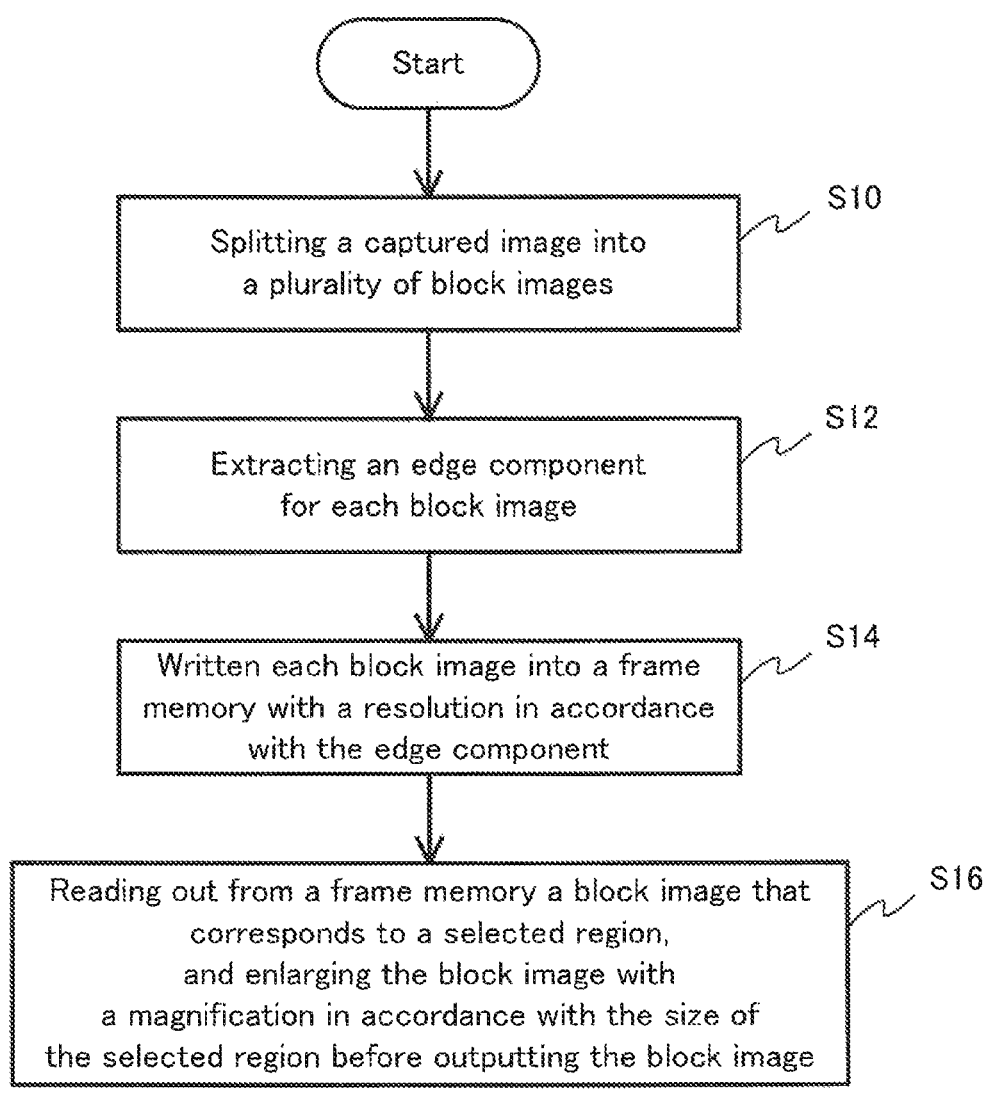
FIG. 2 is a flow chart for illustrating the process flow of digital zooming by means of the image capturing device in FIG. 1.

FIG. 2 illustrates a process flow of digital zooming by means of the image capturing device in the present embodiment.

First, the image splitting unit 21 acquires one frame of images that have been captured by the image sensor 10, and splits it into a plurality of block images in accordance with a split pattern that has been set in advance (step S10).

Next, the edge extracting unit 22 extracts an edge component from each of the plurality of block images that has been split by the image splitting unit 21 (step S12). It is possible for the extraction of an edge component to be carried out in accordance with various types of publicly known techniques.

Next, the resolution controlling unit 23 writes each block image that has been split by the image splitting unit 21 into the frame memory 30 with the resolution in accordance with the amount of edge component that has been extracted by the edge extracting unit 22 (step S14). Concretely, block images having a large amount of edge component are prioritized so as to be written into the frame memory 30 with high resolution, and the remaining block images (that is to say, block images having a small amount of edge component) are written into the frame memory 30 with a resolution that is lower than that of the block images having a large amount of edge component.

The present embodiment adopts such a system where a predetermined number (or ratio) of block images are written into the frame memory 30 with a high resolution in the order where the amount of edge component is greater, and the remaining block images are written into the frame memory 30 with a low resolution. The upper limit of the number (or ratio) of the block images that are written with a high resolution is determined in accordance with the memory capacity of the frame memory 30.

In the case where the captured image has a small amount of edge component as a whole, it is possible for even a block image not having a very large amount of component to be written into the frame memory 30 with a high resolution. Therefore, a threshold value may be set for the amount of edge component so that only block images having edge components of which the amount is the threshold value or greater may be written into the frame memory 30 with a high resolution, and the block images having an amount of edge component that is less than the threshold value even if the amount is at a higher rank may be written into the frame memory 30 with a low resolution.

Next, the image enlarging unit 24 reads out from the frame memory 30 one or more block images that correspond to the selected region, and carries out digital zooming for enlarging the images into a magnification in accordance with the size of the selected region before supplying the images to the enlarged output unit 45 (step S16). As a result, an enlarged image of the selected region is outputted from the enlarged output unit 45. The location and the size of the selected region within the captured image are set in advance; however, the user may change them by directly operating the image capturing device or may change them remotely from another device.

Figure 3:
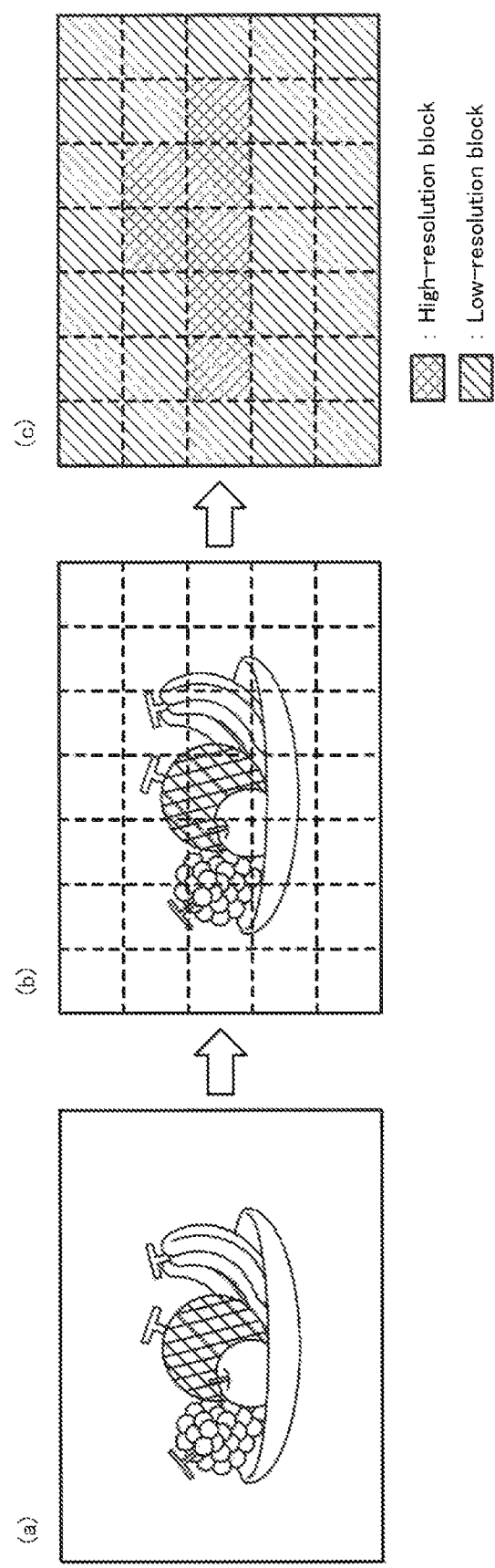
FIG. 3 is a diagram showing how the resolution of a captured image is adjusted block-by-block, and then the image is written into a frame memory.

FIG. 3 shows how the resolution of a captured image is controlled block-by-block before recording the captured image in a frame memory. FIG. 3(*a*) shows an example of a captured image before being split, FIG. 3(*b*) shows an example of the captured image after being split, and FIG. 3(*c*) shows an example where the resolution has been controlled block-by-block. In the present embodiment, a captured image is split with a split pattern in lattice shape; however, it may be split with other split patterns such as aligned thin rectangles. In addition, in the present embodiment, a uniform split pattern is used where all the blocks have the same size and shape; however, there is no such limitation. For example, a split pattern may be used where the split blocks are smaller as their locations are closer to the center of the image, that is to say, the split blocks are larger as their locations get closer to the periphery of the image. Furthermore, in the present embodiment, the resolutions of the respective blocks are controlled in two levels of a high resolution/a low resolution; however, the resolutions may be controlled in three or more levels.

The difference between the conventional systems and the system in the present invention is described in reference to FIG. 4. (1) through (3) in FIG. 4 are conventional systems, whereas (4) is the system in the present invention.

The conventional system (1) is a system where the entire region of a captured image is recorded in a frame memory with a low resolution, and thus, the amount of used memory is similar to that of a low-resolution camera. In the conventional system (1), the amount of used memory is small, and the quality of the images is not greatly affected even with a low magnification; however, the resolution of the enlarged image is low (digital zooming is not very meaningful).

The conventional system (2) is a system where the entire region of a captured image is recorded in a frame memory with a high resolution (two times higher respectively in the longitudinal direction and the lateral direction as compared to the low resolution), and the amount of used memory is four times greater than that of the conventional system (1). In the conventional system (2), the resolution of the enlarged image is high and the image quality is not greatly affected even with a low magnification; however, the amount of used memory is significantly large.

The conventional system (3) is a system where only the enlarged region (central region, for example) that has been set in advance within a captured image is recorded in a frame memory with a high resolution (the remaining region is not recorded), where the amount of used memory is approximately 1 to 1.5 times greater than that of the conventional system (1) depending on the lowest magnification for enlargement or the size of the enlarged region. In the conventional system (3), the resolution of the enlarged image is high, and the amount of used memory is relatively small; however, the magnification cannot be made lower than the lowest magnification for enlargement (or the display is partially omitted due to a lack of image data in the periphery of the enlarged region when the magnification is made lower than the lowest magnification for enlargement).

The present invention system (4) is a system for recording each block that has been split from a captured image with the resolution in accordance with the amount of its edge component. Depending on the ratio of the block to be recorded with a high resolution, the amount of used memory is approximately 1.2 to 1.6 times greater than that in the conventional system (1). In the present invention system (4), the resolution of an enlarged image of a block having a large amount of edge component is high and the amount of used memory is relatively small, and thus, the image can be displayed up to the peripheral portion even when the magnification is low. That is to say, the present invention system (4) collectively has all of the merits of the conventional systems (1) through (3). Here, the resolution of the enlarged image of a block having a small amount of edge component is low; however, it is difficult for the coarseness of the image to be conspicuous even when the magnification is high, and therefore, this can be said to be a demerit that is relatively acceptable.

As described above, the image capturing device in the present embodiment has a configuration that is provided with an image splitting unit 21 and an edge extracting unit 22 that acquire the edge component for each block image that has been divided from an image captured by an image sensor 10, a resolution controlling unit 23 that writes each block image into a frame memory 30 with a resolution in accordance with the amount of its edge component, an image enlarging unit 24 that reads out at least one block image that corresponds to a selected region from the frame memory 30 and enlarges the block image with a magnification in accordance with the size of the selected region, and an enlarged output unit 45 that outputs the enlarged block image that corresponds to the selected region that is supplied from the image enlarging unit 24.

Thus, the resolution of each block image is adjusted to that in accordance with the amount of its edge component so that the writing of the image into the frame memory can be done in such a manner as to be appropriate for assumed digital zooming, with one example being an increase in the resolution of only the region that would probably attract the attention of a user (the region having a high possibility of being enlarged for the purpose of confirmation). Accordingly, the image capturing device in the present embodiment makes it possible to gain an image with high definition even when being digitally zoomed while suppressing an increase in the capacity of the frame memory that is used for the digital zooming.

In addition, the image capturing device in the present invention has such a configuration where the resolution controlling unit 23 gives priority to block images having a large amount of edge component and writes these block images into the frame memory 30 with high resolution, and writes the other block images (that is to say, block images having a small amount of edge component) into the frame memory 30 with a low resolution. Thus, the respective block images are simply divided into at least two levels of resolutions in order to make it possible to effectively reduce the capacity of the frame memory. Needless to say, three or more levels of resolutions may be used.

In addition, the image capturing device in the present embodiment is provided with a standard output unit 40 for outputting the entirety of a captured image with a magnification of one (that is to say, without carrying out digital zooming by using the frame memory 30) separately from the enlarged output unit 45 for outputting an enlarged image of a selected region within the captured image. Accordingly, such an operation becomes possible where the entirety of a captured image is displayed on a first display device, and at the same time, an enlarged image of a selected region within the captured image is displayed on a second display device. Here, a plurality of enlarged output units, which are the same as the enlarged output unit 45, may be provided in the configuration so that enlarged images of different selected regions can be outputted at the same time.

In the above description, a captured image is split into a plurality of block images, and after that, an edge component is extracted for each block image so as to acquire an edge component for each block; however, other techniques may be used. For example, an edge image of the entirety of a captured image may be generated, and this edge image may be split into a plurality of blocks so as to acquire an edge component for each block.

In addition, the process for determining the resolution of each block image in accordance with the amount of its edge component may be carried out for each image of one frame or may be carried out for each image of N frames, where N is more than one.

Furthermore, the resolution at the time when each block image is written in may be a resolution from among a plurality of fixed levels of resolutions or may be a variable resolution that can be calculated in accordance with the amount of edge component.

Though the present invention is described above in detail, the present invention is not limited to the above-described configurations, and needless to say, the invention may be implemented with a configuration other than the above.

In addition, it is possible to provide the present invention as a method or a system for implementing the process according to the present invention, a program for implementing such a method or system with a computer having hardware resources such as a processor and a memory, a recording medium for storing such a program, and the like.

INDUSTRIAL APPLICABILITY

The present invention can be applied to an image capturing device having a function of enlarging a designated region within an image that has been captured by an image sensor and outputting the designated region.

REFERENCE SIGNS LIST

10: Image sensor
20: Image processing unit
21: Image splitting unit
22: Edge extracting unit
23: Resolution controlling unit
24: Image enlarging unit
30: Frame memory
40: Standard output unit
45: Enlarged output unit

The invention claimed is:

1. An image capturing device that enlarges a selected region within an image captured by an image sensor and outputs the enlarged region, comprising:

a block-by-block edge acquiring unit that acquires an edge component for each block image that has been divided from the image captured by the image sensor;

a resolution controlling unit that writes each block image into a frame memory with a resolution in accordance with the amount of the edge component of the block image, wherein the resolution controlling unit writes a first block image having a large amount of edge component into the frame memory with a first resolution, and writes a second block image other than the first block image into the frame memory with a second resolution lower than the first resolution;

an image enlarging unit that reads out from the frame memory at least one block image that corresponds to the selected region, and enlarges the block image that has been read out with a magnification in accordance with the size of the selected region; and an enlarged output unit that outputs the enlarged block image that corresponds to the selected region that has been gained by the image enlarging unit.

2. The image capturing device according to claim 1, further comprising a standard output unit that outputs the entirety of the image captured by the image sensor with a magnification of one.

3. An image processing method that is implemented by an image capturing device that enlarges a selected region within an image captured by an image sensor and outputs the enlarged region, comprising the steps of:

acquiring an edge component of each block image that has been divided from the image captured by the image sensor;

writing each block image into a frame memory with a resolution in accordance with the amount of edge component of the block image, wherein writing each block image into the frame memory includes writing a first block image having a large amount of edge component into the frame memory with a first resolution, and writing a second block image other than the first block image into the frame memory with a second resolution lower than the first resolution; and reading out from the frame memory at least one block image that corresponds to the selected region, and enlarges the block image that has been read out with a magnification in accordance with the size of the selected region before outputting the block image.

* * * * *